Patented Mar. 6, 1928.

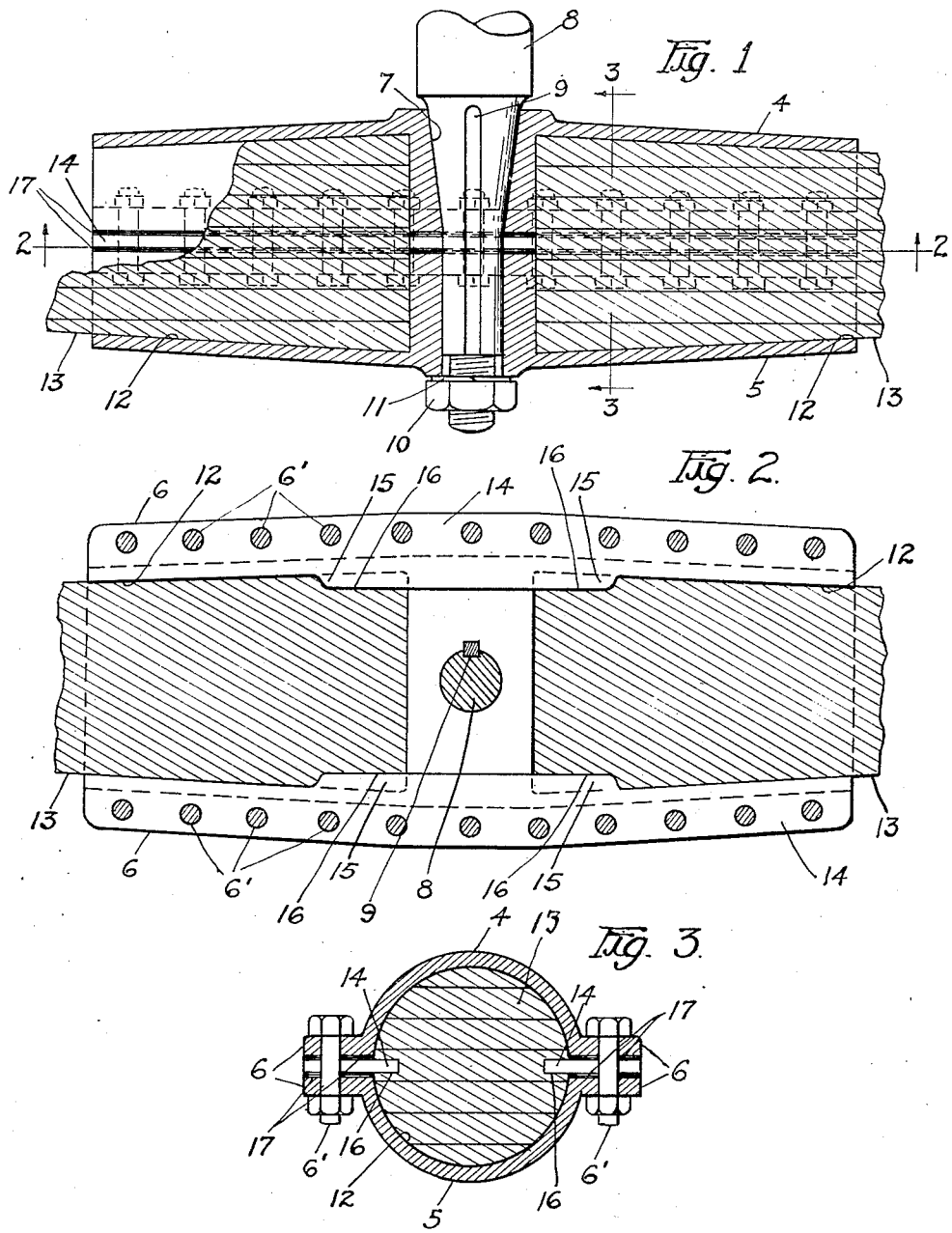

1,661,633

UNITED STATES PATENT OFFICE.

MOSES C. NIXON, OF CHICAGO, ILLINOIS.

HUB FOR PROPELLER BLADES.

Application filed October 4, 1927. Serial No. 224,007.

This application is correlated to my former application Serial No. 106.430, filed May 3, 1926; it being the same subject matter as a part of said copending application, except a change in form of the driving shaft.

The invention relates to improvements in hubs for propeller blades; the objects being to provide an improved propeller and hubs therefor in which the parts are so arranged that the blades may be built up in separate units and then secured to the hubs; an improved split hub in which the parts thereof are adapted to be fastened together and to hold securely the butt ends of individual propeller blades, and such other objects as may hereinafter appear, and consists, preferably, in the construction hereinafter described and illustrated, which may be varied without departing from the spirit of the invention.

In the drawings, Figure 1 is a sectional view of constructon embodying certain principles of the invention; Fig. 2 is a sectional view taken on line 2—2 of Fig. 1, and Fig. 3 is a transverse sectional view taken on line 3—3 of Fig. 1 illustrating certain features of construction shown in Figs. 1 and 2.

In the drawings similar numerals of references indicate corresponding parts in the different views, and referring to the several figures of the drawings, it will be seen that the hub is of split construction and comprises the cooperating parts or members 4 and 5, which are provided with longitudinal and laterally extending flanges 6 disposed adjacent the respective faces of the hub parts, and perforated so that bolts 6' may extend therethrough for securing the parts together. The hub parts 4 and 5 may be of any suitable metal and are provided with an aperture 7 that extends through their central portion. That part of the aperture carried by the part 4 is tapered and that part through part 5 being of uniform diameter, and through this aperture the spindle of the driving shaft 8 projects, which is formed with tapering and uniform portions to correspond with the mating portions of the aperture through the hub parts 4 and 5 and the hub parts are secured thereon, as by key-way 9 with a mating key therein and a nut 10, the latter may be provided with a lock-nut 11 to prevent loosening thereof. It will be noted that the axis of the aperture 7 is substantially at right angles to the meeting faces of the hub parts, the construction being such that when the nut 10 is tightened on the end of the spindle the taper portion of the latter and the nut aids in securing the hub parts together.

The cooperating parts of the hub are formed so as to provide radially extending socket members 12 in which the butt end of the respective blades 13 are mounted. The propeller blades may be of any preferred construction, but those herein shown are built up of laminations of wood, and referring to the drawings, the sockets formed by the cooperating hub parts at their inner ends are considerably larger in diameter than they are at their outer ends. The butt ends of the propeller blades are correspondingly formed to fit snugly in the sockets when the hub parts are secured together; the object of the uniform diameter of the aperture through part 5 of the cooperating hub parts and of the mating portion of the spindle 8 is to give free movement thereon and facilitate clamping of the propeller blade hub in the socket. It will be obvious that in such a construction the socket formed by the cooperating hub parts will take a very reliable grip on the butt ends of the blades when the hub parts are secured together.

In order to prevent any turning movement of the blades in the sockets shim-keys 14 co-extensive with and between the flanges of the cooperating parts 4 and 5 are provided. Portions 15, of the shim-keys 14, near the inner end of each of the sockets extend inwardly into suitable grooves 16 provided in the sides of the respective blades. One or more thin shims 17 between the main shims 14 and the respective flanges of the hub parts are provided, so that if there is any variation in construction or shrinkage of the butt end of the blade, one or more of the thin shims may be removed, which permits the hub parts to be drawn closer together and more securely about the end of blade.

While the preferred embodiment of my invention has been shown and explained it is evident that modifications and changes may be made without departing from the spirit of the invention, and I do not, therefore, confine myself to the details of construction herein set forth.

What I claim is:

1. In combination a split hub comprising cooperating flanged members adapted to be secured together and on a driving shaft, said members being formed so as to provide a radially extending tapered socket split longitudinally and so disposed that its larger end is adjacent the axis of rotation, a propeller blade in said socket and having a groove adjacent the flanges at one side of said socket, a shim key disposed partly in said groove and partly between the flanges adjacent thereto, and means extending through said flanges for fastening said members together.

2. In combination a split hub comprising cooperating members secured together and adapted to be secured on a driving shaft and having a radially-extending longitudinally split socket, a propeller blade with its butt end secured in said socket and having a recess in the side thereof, and a member secured between said cooperating members and having a projection extending into said recess thereby preventing relative rotative movement between the blade and its socket.

3. In combination a hub comprising cooperating flanged members adapted to be secured together and on a driving shaft, said members being formed so as to provide a radially extending longitudinally split socket, a propeller blade in said socket and having a longitudinally extending groove adjacent the flange at one side of said socket, a shim-key disposed partly in said groove and partly between the flanges adjacent thereto, and means extending through said flanges for fastening said members together clamping the blade in its socket and holding said shim-key in position to prevent relative rotative movement between the blade and socket.

4. In combination a split hub comprising cooperating flanged members secured together and adapted to be secured on a driving shaft and to form radially extending sockets with propeller blades secured therein, said members being provided with transversely extending aligned bores therethrough, one of said bores being tapered and the other being of uniform diameter, the propeller shaft having tapered and uniform diameter portions adapted to fit said respective bores, a shim-key, disposed between the adjacent flanges of said hub members and extending into the blade, means to clamp the adjacent flanges of said hub members together, and a nut on the end of said shaft for drawing the tapered portion of the shaft firmly into said tapered bore thereby aiding in clamping the hub parts together.

5. In combination a split hub comprising cooperating members secured together and adapted to be secured on a driving shaft and to form radially extending sockets adapted to receive the butt ends of propeller blades, said members being provided with transversely extending aligned bores therethrough, the bore through the inner hub member being tapered and that through the outer member of uniform diameter, the driving shaft having tapered and straight portions to fit said respective bores thereby providing resistance and free movement in the respective bores, shims disposed between the mating faces of the hub members and extending into the blades, means for securing the hub members together, and a nut on the end of said shaft to aid in drawing the hub parts together and securing them on said shaft.

6. In combination, a hub comprising members adapted to be secured together and on a driving shaft, said members being formed to provide a radially extending longitudinally split socket, a propeller blade in said socket and having a longitudinally extending groove at one side of the socket, a shim-key disposed partly in said groove and partly between said members, and means for fastening said members together and the shim-key in position to prevent relative rotary movement between the blade and socket.

7. In a hub comprising cooperating flanged members adapted to be secured together and on a driving shaft, said members being formed to provide a radially extending, longitudinally split socket, a propeller blade in said socket and having a longitudinally extending groove adjacent the flanges at one side of the socket, a shim-key disposed partly in said groove and partly between the flanges adjacent thereto, and means for fastening said members, flanges and shim-key together, and the shim-key in position to prevent relative rotary movement of the blade and socket.

MOSES C. NIXON.